United States Patent [19]

Dudley

[11] Patent Number: 5,012,652
[45] Date of Patent: May 7, 1991

[54] CRANKCASE HEATER CONTROL FOR HERMETIC REFRIGERANT COMPRESSORS

[75] Inventor: Kevin F. Dudley, Cazenovia, N.Y.
[73] Assignee: Carrier Corporation, Syracuse, N.Y.
[21] Appl. No.: 586,122
[22] Filed: Sep. 21, 1990
[51] Int. Cl.$^5$ .............................................. F25B 43/02
[52] U.S. Cl. ......................................... 62/192; 62/472
[58] Field of Search ................ 62/192, 193, 472, 468, 62/469, 470, 471, 208, 209, 84; 184/6.22, 104.1; 147/14, 32, 281

[56] References Cited

U.S. PATENT DOCUMENTS

| | | | |
|---|---|---|---|
| 3,705,499 | 12/1972 | Mount et al. | 62/192 X |
| 4,066,869 | 1/1978 | Apaloo et al. | 62/472 X |
| 4,208,883 | 6/1980 | Stirling | 62/192 |
| 4,236,379 | 12/1980 | Mueller | 62/472 X |

OTHER PUBLICATIONS

"Slugging Prevention-Liquid Refrigerant Control in Refrigeration, A/C Systems", *Air Conditioning, Heating & Refrigeration News*, Aug. 27, 1990, pp. 28-30.

Primary Examiner—Harry B. Tanner
Attorney, Agent, or Firm—David J. Zobkiw

[57] ABSTRACT

The temperature is sensed at the compressor, indoor coil and outdoors. The sensed temperatures are compared and if the compressor temperature is not a specified amount higher than the lower of the other two sensed temperatures, then the crankcase heater is energized. When the compressor temperature rises to or is a specified amount above the lower of the other two temperatures, the crankcase heater is deenergized.

2 Claims, 1 Drawing Sheet

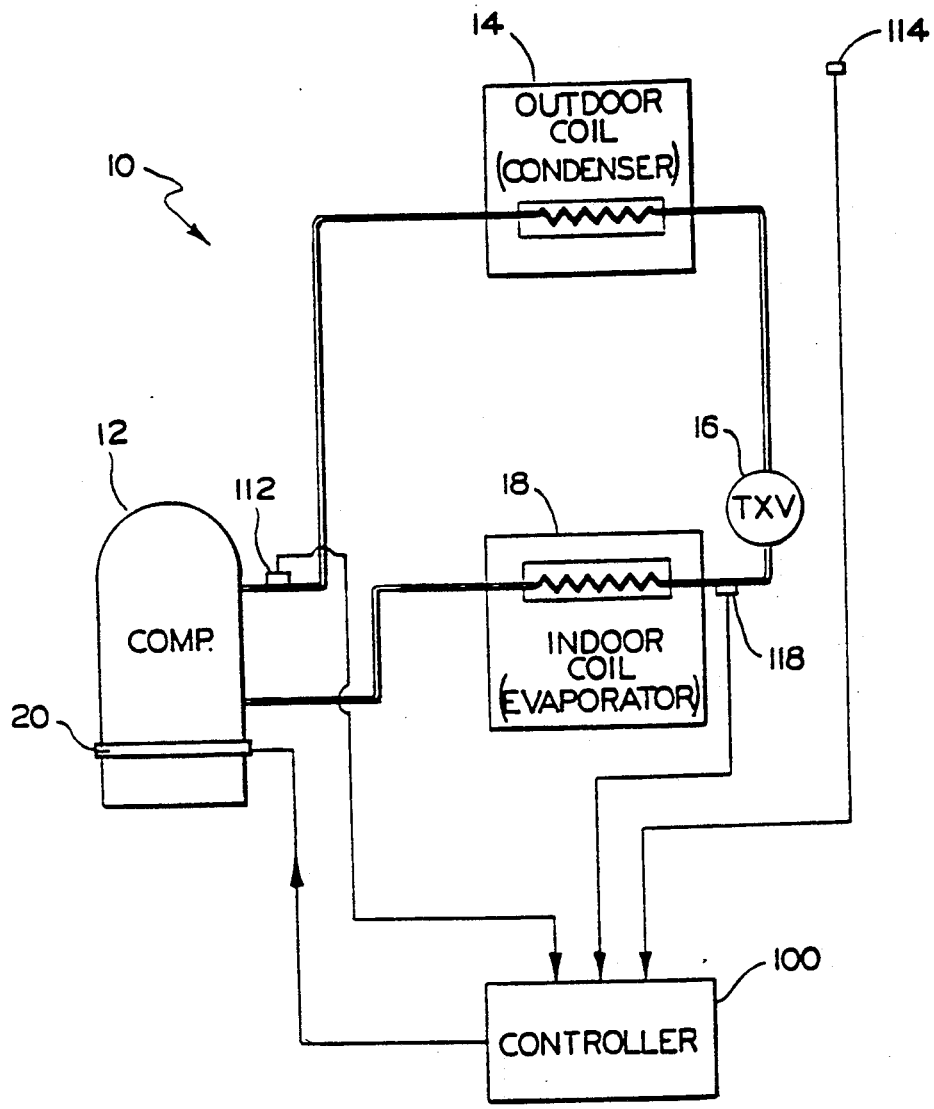

CRANKCASE HEATER CONTROL FOR HERMETIC REFRIGERANT COMPRESSORS

BACKGROUND OF THE INVENTION

There is an affinity between the refrigerants and lubricants used in refrigeration systems. As a result, it is normal for some refrigerant to be present in the oil and for some oil to be present in the refrigerant. When the hermetic compressor is shut off, refrigerant in the system tends to migrate and condense. Since the compressor is often at a low point in the system there is a tendency for the refrigerant to collect there diluting the oil in the sump and posing the risk of a flooded start due to the presence of liquid refrigerant. Crankcase heaters are designed to keep refrigerant from migrating into the crankcase or sump of a hermetic compressor during an off cycle. The crankcase heaters are normally energized continuously even though they are only effective part of the time.

SUMMARY OF THE INVENTION

The present invention provides a way of energizing the crankcase heater only when needed thereby reducing the energy consumed by the heater. This is achieved by controlling the crankcase heater relative to sensed temperatures so that migration to and condensation in the sump is at least reduced if not eliminated.

It is an object of this invention to prevent refrigerant migration to the sump of a hermetic compressor.

It is another object of this invention to control crankcase heat in a hermetic compressor.

It is a further object of this invention to reduce the amount of energy required by a crankcase heater. These objects, and others as well become apparent hereinafter, are accomplished by the present invention.

Basically, temperature is sensed at the compressor, the indoor coil and outdoors. The sensed temperatures are compared and if the compressor temperature is not a specified amount higher than the lower of the other two sensed temperatures, then the crankcase heater is energized. When the compressor temperature rises to or is a specified amount above the lower of the other two temperatures then the crankcase heater is deenergized.

BRIEF DESCRIPTION OF THE DRAWING

For a fuller understanding of the present invention, reference should now be made to the following detailed description thereof taken in conjunction with the accompanying drawing wherein:

The FIGURE is a schematic representation of a closed refrigeration system and its controls for regulating the crankcase heater.

DESCRIPTION OF THE PREFERRED EMBODIMENT

In the FIGURE the numeral 12 generally designates a hermetic compressor in a closed refrigeration system 10 configured as a heat pump in the cooling mode. Starting with compressor 10, the system serially includes compressor 12, outdoor coil or condenser 14, thermal expansion device, TXV, 16 and indoor coil or evaporator 18. The compressor 12 and indoor coil 18 are located inside of the house or building being cooled and TXV 16 is either inside of the house or in close proximity thereto. In the operation of system 10, hot, high pressure refrigerant gas from compressor 12 is supplied to condenser 14 where the refrigerant gas condenses to a liquid which is supplied to TXV 16. TXV 16 causes a pressure drop and partial flashing of the liquid refrigerant passing therethrough. The liquid refrigerant supplied to evaporator 18 evaporates to cool the house or building and the resultant gaseous refrigerant is supplied to compressor 12 to complete the cycle.

The system described above is conventional and to prevent the migration of refrigerant to compressor 12, a crankcase heater would conventionally be provided. The crankcase heater would be run continuously or responsive to the oil temperature. While such operation is effective, it can be wasteful of energy.

According to the teachings of the present invention, the refrigerant temperature is sensed at the discharge of the compressor 12 by sensor 112 and at the inlet side of the evaporator 18 by sensor 118. Additionally, the outside or ambient air temperature is sensed by sensor 114. Sensors 12, 114 and 118 are connected to controller 100 so as to provide sensed temperature information thereto. Controller 100, typically, will be a part of a microprocessor controlling system 10.

Compressor 12 is provided with a crankcase heater 20 which may be of the band type which is placed around the shell of compressor 12 in the region of the oil sump, as illustrated, or may be of the type which penetrates the shell of compressor 12 and extends into the oil sump. Unlike conventional crankcase heaters which are either on whenever the compressor is not running, or are on responsive to oil sump temperature, the present invention has crankcase heater 20 under the control of controller 100. Controller 100 activates crankcase heater 20 responsive to the temperatures sensed by sensors 112, 114 and 118. Specifically, the temperature sensed at the compressor discharge by sensor 112, when compressor 12 is shut off, is maintained within a predetermined temperature range above the lower of the temperatures sensed by sensors 114 and 118 by energizing crankcase heater 20. A preferred temperature range is 5 to 10° F. above the lower of the temperatures sensed by sensors 114 and 118. When the temperature sensed at the compressor discharge by sensor 112 exceeds the lower of the temperatures sensed by sensors 114 and 118 crankcase heater is deenergized or remains unenergized.

From the foregoing it should be clear that, in the present invention, the crankcase heater 20 is only energized when conditions favor refrigerant migration into the compressor 12 but that crankcase heater 20 is deenergized the rest of the time which results in energy savings for the system.

Although a preferred embodiment of the present invention has been described and illustrated, other changes will occur to those skilled in the art. For example, both crankcase heater 20 and sensor 112 may be located in the sump of the compressor 12 so as to be able to directly heat the oil and directly sense the temperature of the oil. It is therefore intended that the scope of the present invention is to be limited only by the scope of the appended claims.

What is claimed is:

1. In a refrigeration system serially including a hermetic compressor having a crankcase heater, an outdoor coil, an expansion device, and an indoor coil, crankcase heater control means comprising:

first temperature sensing means for sensing a temperature indicative of outdoor temperature;
second temperature sensing means for sensing a temperature indicative of indoor coil temperature;

third temperature sensing means for sensing a temperature indicative of compressor temperature;
controller means operatively connected to said first, second and third temperature sensing means and said crankcase heater for comparing said temperatures sensed by said first, second and third temperature sensing means when said compressor is deenergized and for energizing said crankcase heater when said temperature sensed by said third temperature sensing means is less than a predetermined amount above the lower of said temperatures sensed by said first and second temperature sensing means and for deenergizing said crankcase heater when said temperature sensed by said third temperature sensing means is more than a second predetermined amount above the lower of said temperatures sensed by said first and second temperature sensing means.

2. The crankcase heater control means of claim 1 wherein said predetermined amount is 5 to 10° F.

* * * * *